(12) United States Patent
Brasier

(10) Patent No.: US 12,539,819 B2
(45) Date of Patent: Feb. 3, 2026

(54) VEHICULAR VISION SYSTEM WITH TAILGATE CONTROL

(71) Applicant: Magna Electronics Inc., Auburn Hills, MI (US)

(72) Inventor: Brian D. Brasier, Howell, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 392 days.

(21) Appl. No.: 18/295,920

(22) Filed: Apr. 5, 2023

(65) Prior Publication Data

US 2023/0322167 A1  Oct. 12, 2023

Related U.S. Application Data

(60) Provisional application No. 63/362,621, filed on Apr. 7, 2022.

(51) Int. Cl.
*B60R 11/04* (2006.01)
*E05F 15/73* (2015.01)

(52) U.S. Cl.
CPC .............. *B60R 11/04* (2013.01); *E05F 15/73* (2015.01); *B60R 2300/80* (2013.01); *E05F 2015/765* (2015.01); *E05Y 2400/44* (2013.01)

(58) Field of Classification Search
CPC ...................................................... E05F 15/73
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,587,186 | B2 | 7/2003 | Bamji et al. |
| 6,674,895 | B2 | 1/2004 | Rafii et al. |
| 6,678,039 | B2 | 1/2004 | Charbon |
| 6,690,354 | B2 | 2/2004 | Sze |
| 6,710,770 | B2 | 3/2004 | Tomasi et al. |
| 6,836,209 | B2 | 12/2004 | Ploucha |
| 6,876,775 | B2 | 4/2005 | Torunoglu |
| 6,906,793 | B2 | 6/2005 | Bamji et al. |
| 6,919,549 | B2 | 7/2005 | Bamji et al. |
| 7,026,930 | B2 | 4/2006 | Appel et al. |
| 7,038,577 | B2 | 5/2006 | Pawlicki et al. |
| 7,053,357 | B2 | 5/2006 | Schwarte |
| 7,157,685 | B2 | 1/2007 | Bamji et al. |

(Continued)

*Primary Examiner* — Jerry T Jean Baptiste
(74) *Attorney, Agent, or Firm* — HONIGMAN LLP

(57) ABSTRACT

A vehicular vision system includes a camera disposed at a rear portion of a vehicle and operable to capture image data and an image processor for processing image data captured by the camera. The vehicle has a tailgate that is pivotable about a horizontal pivot axis and movable along a downward swing path from a closed position toward an opened position. Image data captured by the camera is processed by the image processor to detect presence of an object in a field of view of the camera. The system, responsive to detection of the object, determines location of the object relative to the downward swing path of the tailgate. The system, responsive to determination that the object is located within the downward swing path of the tailgate between the closed position and the opened position, limits movement of the tailgate of the vehicle toward the opened position.

28 Claims, 4 Drawing Sheets

(56) References Cited

U.S. PATENT DOCUMENTS

| | | |
|---|---|---|
| 7,176,438 B2 | 2/2007 | Bamji et al. |
| 7,203,356 B2 | 4/2007 | Gokturk et al. |
| 7,212,663 B2 | 5/2007 | Tomasi |
| 7,280,035 B2 | 10/2007 | McLain et al. |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,528,703 B2 | 5/2009 | Touge |
| 7,547,058 B2 | 6/2009 | King et al. |
| 7,720,580 B2 | 5/2010 | Higgins-Luthman |
| 7,855,755 B2 | 12/2010 | Weller et al. |
| 8,013,780 B2 | 9/2011 | Lynam |
| 8,027,029 B2 | 9/2011 | Lu et al. |
| 8,638,205 B2 | 1/2014 | Boehme et al. |
| 8,830,317 B2 | 9/2014 | Meier |
| 8,874,317 B2 | 10/2014 | Marczok et al. |
| 9,036,026 B2 | 5/2015 | Dellantoni et al. |
| 9,068,390 B2 | 6/2015 | Ihlenburg et al. |
| 9,085,261 B2 | 7/2015 | Lu et al. |
| 9,146,898 B2 | 9/2015 | Ihlenburg et al. |
| 9,269,263 B2 | 2/2016 | Gieseke |
| 9,446,713 B2 | 9/2016 | Lu et al. |
| 9,470,034 B2 | 10/2016 | Ihlenburg et al. |
| 9,575,160 B1 | 2/2017 | Davis et al. |
| 9,599,702 B1 | 3/2017 | Bordes et al. |
| 9,609,757 B2 | 3/2017 | Steigerwald |
| 9,689,967 B1 | 6/2017 | Stark et al. |
| 9,753,121 B1 | 9/2017 | Davis et al. |
| 9,900,490 B2 | 2/2018 | Ihlenburg et al. |
| 10,046,706 B2 | 8/2018 | Larson et al. |
| 10,071,687 B2 | 9/2018 | Ihlenburg et al. |
| 10,072,453 B2 | 9/2018 | Ihlenburg et al. |
| 10,099,614 B2 | 10/2018 | Diessner |
| 10,442,360 B2 | 10/2019 | LaCross et al. |
| 10,484,587 B2 | 11/2019 | Conger |
| 10,567,705 B2 | 2/2020 | Ziegenspeck et al. |
| 11,124,113 B2 | 9/2021 | Singh |
| 11,285,878 B2 | 3/2022 | Sigle |
| 11,603,041 B2 | 3/2023 | Singh |
| 2002/0074959 A1 | 6/2002 | Van Wiemeersch |
| 2002/0084675 A1 | 7/2002 | Buchanan et al. |
| 2005/0012603 A1 | 1/2005 | Ewerhart et al. |
| 2007/0236364 A1 | 10/2007 | Hubbard et al. |
| 2007/0273554 A1 | 11/2007 | Sakakibara |
| 2007/0296242 A1 | 12/2007 | Frommer et al. |
| 2008/0294314 A1 | 11/2008 | Morris et al. |
| 2009/0000196 A1 | 1/2009 | Kollar et al. |
| 2009/0121852 A1 | 5/2009 | Breuer et al. |
| 2010/0245066 A1 | 9/2010 | Sarioglu et al. |
| 2011/0043633 A1 | 2/2011 | Sarioglu et al. |
| 2011/0109469 A1 | 5/2011 | Trim |
| 2011/0175752 A1 | 7/2011 | Augst |
| 2011/0196568 A1 | 8/2011 | Nickolaou et al. |
| 2013/0055639 A1 | 3/2013 | Brosseit |
| 2013/0093583 A1 | 4/2013 | Shapiro |
| 2013/0116905 A1 | 5/2013 | Lucking et al. |
| 2013/0235204 A1 | 9/2013 | Buschmann |
| 2014/0098230 A1 | 4/2014 | Baur |
| 2014/0168415 A1 | 6/2014 | Ihlenburg et al. |
| 2014/0168437 A1 | 6/2014 | Rother et al. |
| 2014/0218529 A1 | 8/2014 | Mahmoud et al. |
| 2014/0285666 A1 | 9/2014 | O'Connell et al. |
| 2014/0313339 A1 | 10/2014 | Diessner |
| 2014/0340510 A1 | 11/2014 | Ihlenburg et al. |
| 2015/0022664 A1 | 1/2015 | Pflug et al. |
| 2015/0344028 A1 | 12/2015 | Gieseke et al. |
| 2016/0082887 A1 | 3/2016 | Turk |
| 2016/0114728 A1 | 4/2016 | Tan et al. |
| 2017/0015312 A1 | 1/2017 | Latotzki |
| 2017/0017848 A1 | 1/2017 | Gupta et al. |
| 2017/0030136 A1 | 2/2017 | Ihlenburg et al. |
| 2017/0050672 A1 | 2/2017 | Gieseke et al. |
| 2017/0054881 A1* | 2/2017 | Conger ............... H04N 23/57 |
| 2017/0222311 A1 | 8/2017 | Hess et al. |
| 2017/0253237 A1 | 9/2017 | Diessner |
| 2017/0254873 A1 | 9/2017 | Koravadi |
| 2017/0276788 A1 | 9/2017 | Wodrich |
| 2017/0314318 A1 | 11/2017 | Hassenpflug |
| 2017/0315231 A1 | 11/2017 | Wodrich |
| 2017/0317748 A1 | 11/2017 | Krapf |
| 2017/0329346 A1 | 11/2017 | Latotzki |
| 2017/0356994 A1 | 12/2017 | Wodrich et al. |
| 2018/0015875 A1 | 1/2018 | May et al. |
| 2018/0045812 A1 | 2/2018 | Hess |
| 2018/0134217 A1 | 5/2018 | Peterson et al. |
| 2018/0231635 A1 | 8/2018 | Woehlte |
| 2019/0118717 A1 | 4/2019 | Blank et al. |
| 2019/0339382 A1 | 11/2019 | Hess et al. |
| 2021/0078501 A1* | 3/2021 | Lorenzo ............... B60R 9/10 |
| 2021/0155167 A1 | 5/2021 | Lynam et al. |
| 2021/0162926 A1 | 6/2021 | Lu |
| 2021/0245662 A1 | 8/2021 | Blank et al. |
| 2022/0227366 A1 | 7/2022 | Shah |
| 2022/0275677 A1* | 9/2022 | Lee ..................... G06T 7/13 |
| 2023/0031005 A1* | 2/2023 | Kishimoto ........ H03K 17/955 |
| 2024/0064274 A1 | 2/2024 | Blank et al. |

* cited by examiner

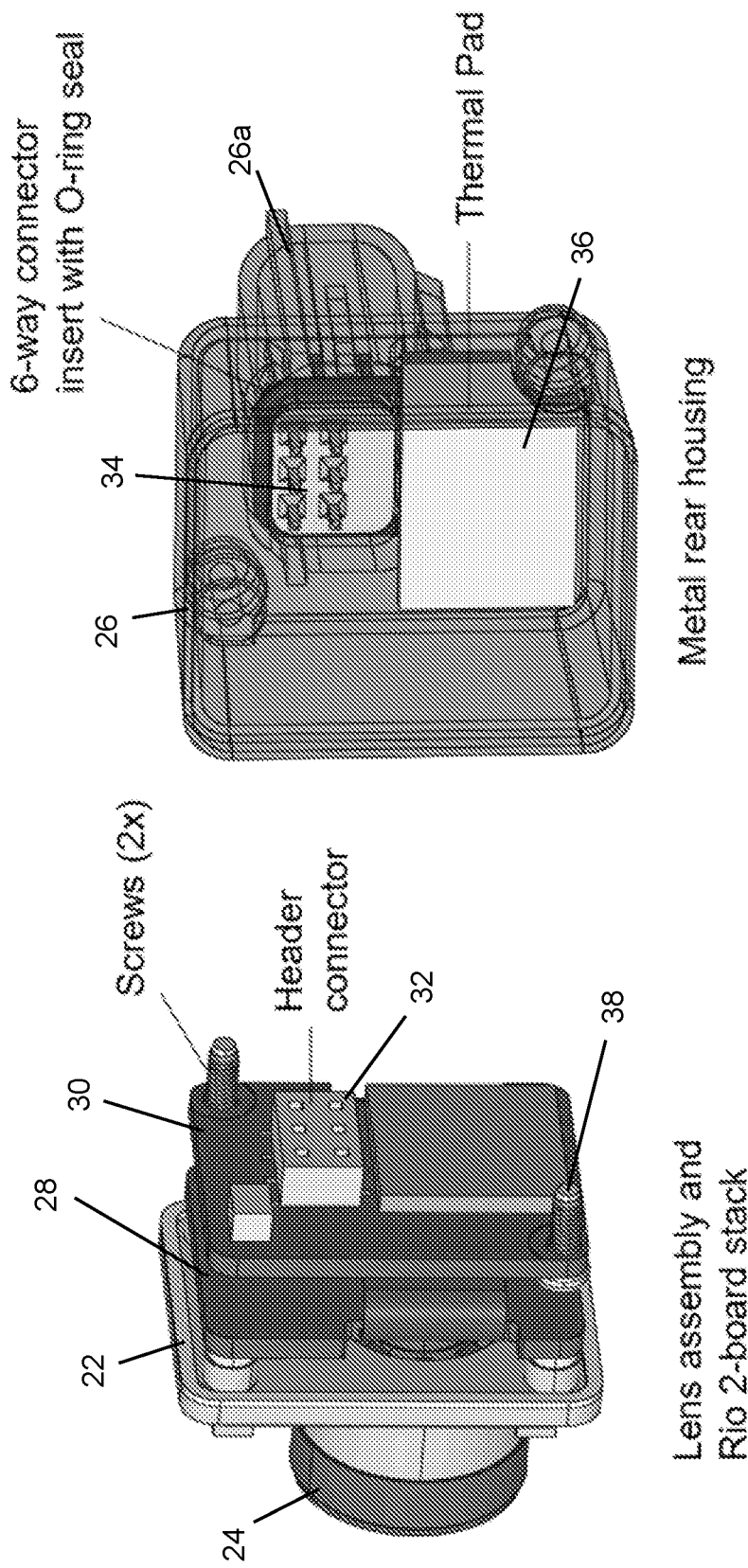

VEHICULAR VISION SYSTEM WITH TAILGATE CONTROL

CROSS REFERENCE TO RELATED APPLICATION

The present application claims the filing benefits of U.S. provisional application Ser. No. 63/362,621, filed Apr. 7, 2022, which is hereby incorporated herein by reference in its entirety.

FIELD OF THE INVENTION

The present invention relates generally to a vehicular vision system for a vehicle and, more particularly, to a vehicular vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

A driving assistance system or vision system or imaging system for a vehicle utilizes one or more cameras (preferably one or more CMOS cameras) to capture image data representative of images exterior of the vehicle, and provides control of a tailgate of the vehicle to limit or preclude fully opening the tailgate when a hitch (including a hitch ball mounted at an extending portion that is configured to be partially received at a hitch receiver of the vehicle) is attached at the hitch receiver of the vehicle. The camera is disposed at a rear portion of the vehicle and captures image data. The tailgate of the vehicle is openable along a downward swing path of the tailgate. An image processor processes image data captured by the camera to detect presence of objects in the field of view of the camera. The image data captured by the camera is processed by the image processor to detect presence of the hitch attached at a hitch receiver of the vehicle or to detect presence of an object behind the vehicle that may interfere with opening of the tailgate. The vehicular vision system, responsive to detection of the hitch attached at the hitch receiver of the vehicle and/or detection of the object that may interfere with opening of the tailgate, limits opening of the tailgate of the vehicle.

These and other objects, advantages, purposes and features of the present invention will become apparent upon review of the following specification in conjunction with the drawings.

BRIEF DESCRIPTION OF THE DRAWINGS

FIG. 3 is a perspective view of a lens assembly and two-board PCB stack of the smart camera of FIG. 2A;

FIG. 4 is a perspective view of a metal rear housing of the smart camera of FIG. 2A.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward or rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
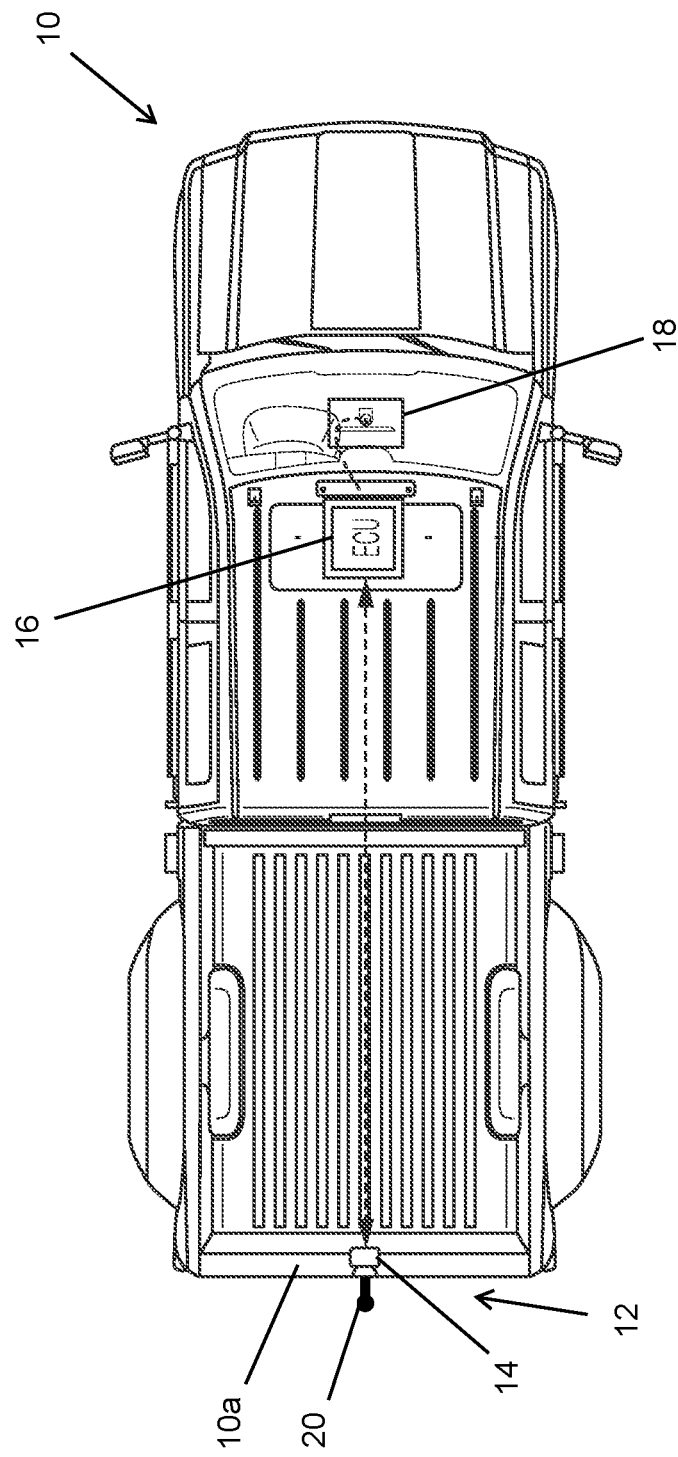
FIG. 1 is a plan view of a vehicle with a vehicular vision system that incorporates a rear camera for detecting presence of a hitch attached at a hitch receiver of the vehicle.
Figure 2B:
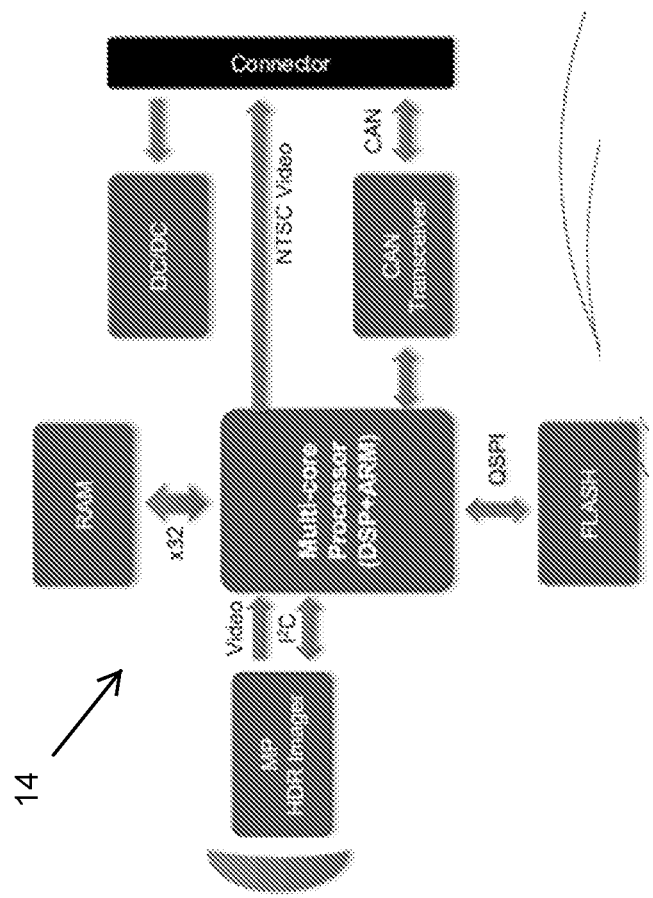
FIG. 2B is a block diagram of the smart camera of FIG. 2A.
Figure 2A:
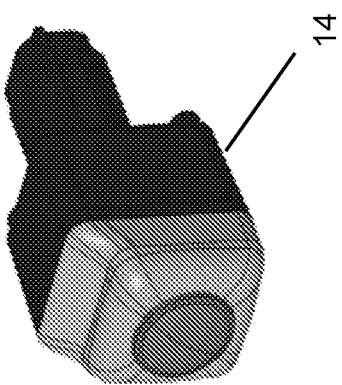
FIG. 2A is a perspective view of a RIO smart camera, suitable for use with the vehicular vision system.
Figure 5:
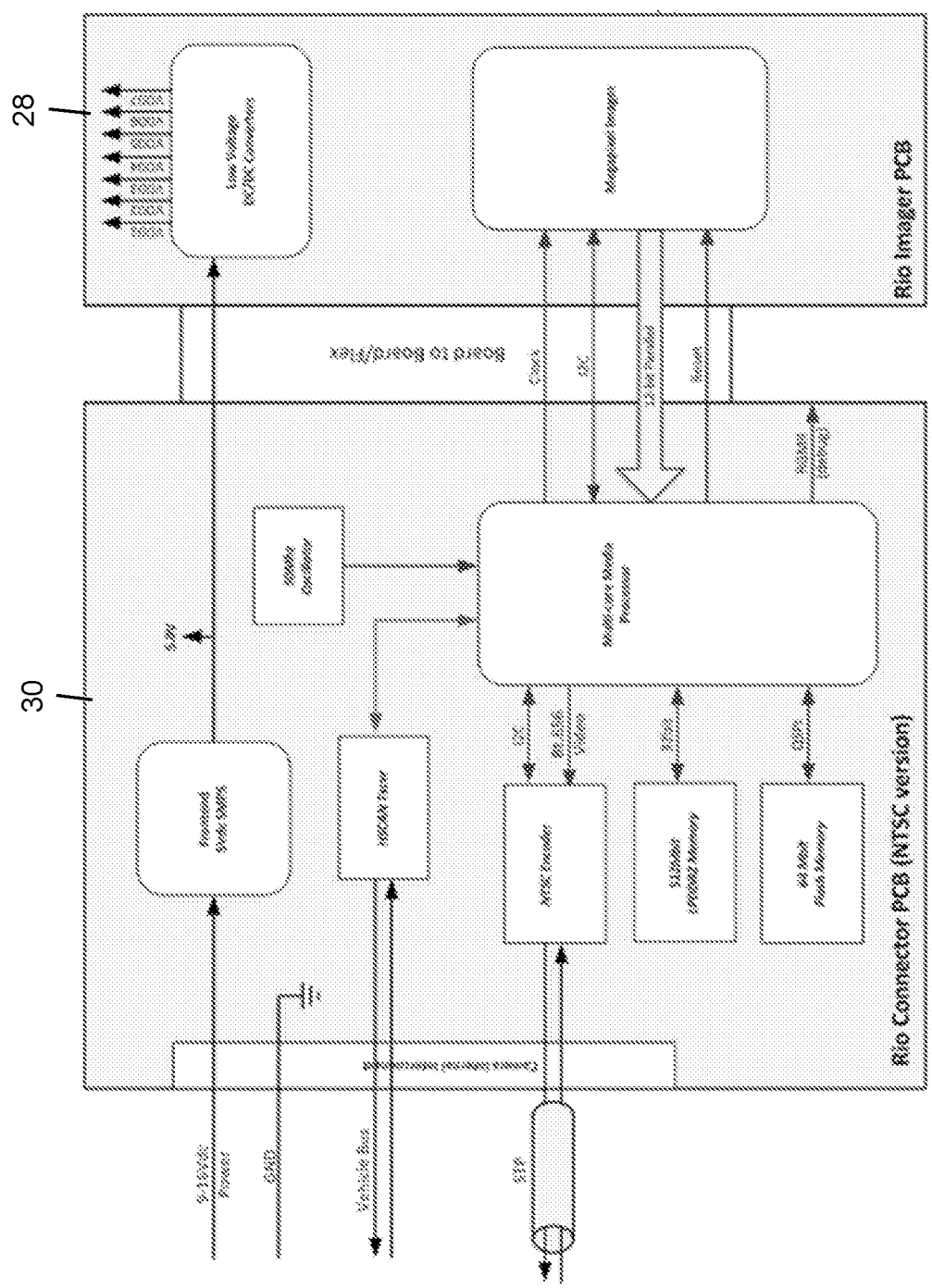
FIG. 5 is a block diagram of the PCBs of the two-board PCB stack of the smart camera of FIG. 2A.

Referring now to the drawings and the illustrative embodiments depicted therein, a vehicle 10 (such as a pickup truck with a tailgate 10*a*) includes an imaging system or vision system 12 that includes at least one exterior viewing imaging sensor or camera, such as a rearward viewing imaging sensor or camera 14 (and the system may optionally include multiple exterior viewing imaging sensors or cameras, such as a forward viewing camera at the front (or at the windshield) of the vehicle, and a sideward/rearward viewing camera at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 16 having electronic circuitry and associated software, with the electronic circuitry including a data processor or image processor that is operable to process image data captured by the camera or cameras, whereby the ECU may detect or determine presence of objects or the like and/or the system provide displayed images at a display device 18 for viewing by the driver of the vehicle (the ECU and/or display may be part of or incorporated in or at an interior rearview mirror assembly of the vehicle, the control and/or the display device may be disposed elsewhere at or in the vehicle). The data transfer or signal communication from the camera to the ECU may comprise any suitable data or communication link, such as a vehicle network bus or the like of the equipped vehicle (such as by utilizing aspects of the systems described in U.S. Pat. Nos. 11,285,878; 10,567,705; 10,484,587; 9,900,490 and/or 9,609,757, which are hereby incorporated herein by reference in their entireties).

As shown in FIG. 1, the camera 14 is disposed at a rear portion of the vehicle 10 such that the camera views at least a portion of a hitch 20 that is attached at a hitch receiver of the vehicle. For example, the camera 14 may be disposed at or integrated into the tailgate 10a (such as at a handle assembly for releasing a latch mechanism and opening the tailgate) or a rear bumper of the vehicle and above the hitch receiver. The camera captures image data and the captured image data is processed (such as at an image processing chip of the camera or at an image processor of the ECU) to determine whether or not the hitch 20 is attached at the hitch receiver. If the hitch 20 is attached at the hitch receiver, the system 12 controls or limits opening of the tailgate 10a of the vehicle (e.g., full tailgate deployment is disabled) to avoid damage of the tailgate that could occur if the tailgate were opened/lowered into the hitch. The control or disablement of the latch mechanism of the tailgate may be provided via a CAN bus (controller area network) of the vehicle.

Optionally, the system may also be operable to detect presence of an aftermarket step (or other attachment) at the rear bumper of the vehicle (or such as attached at the hitch receiver of the vehicle) that may be in the path of the tailgate if the tailgate is fully opened/lowered. Thus, the same function can work for aftermarket products (e.g., detection of a hitch receiver-mounted pickup bed step, a bike rack received at the hitch receiver or other attachment). In such an application, the bed step or bike rack (or other attachment) is inserted into the hitch receiver. If the bed step or bike rack (or other attachment) is large enough so as to encroach into the swing path of the tailgate, the system will limit or disable opening of the tailgate. However, such aftermarket steps or attachments may have small enough profiles such that they would not encroach into the tailgate swing path. In such an application, the system, which knows the position of the step or other sufficiently small attachment (via image processing of image data captured by the camera) and the tailgate swing path, would allow the tailgate to be fully opened.

Furthermore, the system may be operable to detect presence of an object at or near the rear of the vehicle that is not attached to the hitch, such as a wall or stationary object like a fire hydrant or pile of bricks or a moving object like a pedestrian or animal. In response to detecting presence of the object at or near the rear of the vehicle, the system may determine if the object is within the swing path of the tailgate 10a (i.e., the path along which the tailgate moves between its closed position and its opened position). If the detected object is determined to be in or near the swing path of the tailgate, the system limits or prevents movement of the tailgate 10a from the closed position toward the opened position, such as by preventing release of the latch mechanism to retain the tailgate 10a in the closed position or by limiting movement of the tailgate 10a along the swing path. In other words, other objects that could potentially damage the tailgate or lift gate are considered, including objects that are not attached to the hitch (e.g., a fire hydrant, a bike rack, a pile of bricks sitting on the ground yet in the path of travel of the gate, and the like). That is, the other object detected by the system does not need to be something attached to the hitch 20. Thus, if the driver performs a reversing maneuver and backs the vehicle close to the fire hydrant or other object that is tall enough to interfere with the tailgate travel, the camera may detect the interference condition and restrict or prevent tailgate travel.

The system thus provides a smart rear camera with object detection features capable of identifying a hitch or other object (e.g., a fire hydrant or pile of bricks) in the path of the opening tailgate. The system knows the path of the tailgate relative to the camera (which may be a dedicated camera for this system or may be the rear backup camera of the vehicle or other rearward viewing vehicle camera that includes at least a portion of an attached hitch in its field of view) and can determine if a detected object (e.g., the attached hitch) is in the path of travel of the tailgate. The system or processor or camera identifies if an object or hitch is in the path of the tailgate or tailgate subsystem and the system may interlock or limit or control the tailgate opening process. That is, full tailgate deployment is disabled when the system determines that the hitch or step or other object is in the path of travel of the tailgate when the tailgate opens.

The camera may comprise a camera and object detection software for processing image data captured by the camera. Optionally, the camera may comprise a smart camera that is capable of running the "hitch detection" or "obstruction in tailgate path" software.

During operation (such as when the vehicle is not moving and when opening of the tailgate is attempted), the camera or system detects an object in the tailgate path either before or immediately upon tailgate opening action. Responsive to determination of presence of the hitch (or other object) in the tailgate opening path, the system activates an interlock in the tailgate opening controls. For example, the system may actuate a mechanical interlock that limits or stops or precludes opening movement of the tailgate, such as limiting releasing the tailgate to start opening or stopping downward movement of the tailgate at a location above the hitch. Optionally, the system may control electronic control movement of the tailgate to limit opening of an automatic or powered tailgate. That is, the system may control powered opening of the tailgate based on the detected object and the determined position of the object relative to the tailgate.

The system may operate to detect the hitch and to control or limit opening of the tailgate responsive to actuation of a release handle of the tailgate (or actuation of a control for powered opening of the tailgate). The system, responsive to detection of the hitch when the tailgate is being opened (or at commencement of opening of the tailgate), may limit opening movement and/or may generate an alert to the operator, who may be at the rear of the vehicle (whereby the alert may comprise an audible alert or a flashing light at the tailgate) or in the vehicle cabin (whereby the alert may comprise an audible alert or a flashing light in the cabin or a visual alert at a video display in the cabin that is viewed by the operator).

The tailgate travel path is known in advance. Knowledge of this path and awareness of the hitch (or other object) location is used to determine in advance if a collision will occur between the tailgate and the hitch (or other object). The system can lock out the secondary tailgate travel to limit or stop movement of the tailgate to avoid the collision and prevent damage to the tailgate. In other words, the system may have the tailgate travel path stored in memory and, in determining to limit opening of the tailgate, the system may compare the determined position of the detected object to the known travel path.

Because the camera 14 may be disposed at the tailgate 10a and thus move with the tailgate 10a as the tailgate moves between the closed position and the opened position, determination of whether the detected object is in the path of the tailgate may occur before the tailgate is permitted to move from the closed position to ensure accuracy of the object detection. For example, when the tailgate 10a is in the closed position, the relative position of the camera 14 to the object may be easier to determine than when the tailgate 10a and camera are moving toward the opened position and thus toward the object. Optionally, in response to detecting the object in the captured image data and before the user requests to open the tailgate (e.g., grasps the handle at the tailgate or actuates the input at the keyfob or interior of the vehicle), the system may determine if the object is within the opening path of the tailgate 10a to more quickly react (e.g., prevent opening of the tailgate) when the user requests to open the tailgate.

The system may also capture image data during a reversing maneuver of the vehicle to determine if a trailer hitch is attached at the hitch receiver and to determine if the hitch may impact an object (e.g., another vehicle, a garage wall, a pile of bricks, and the like), rearward of the vehicle during the reversing maneuver. By determining the rearward-most extended position of the hitch, the smart camera may also apply automatic braking or generate an alert (e.g., sound an alarm or display a warning at the vehicle display) prior to collision.

Optionally, the system may use the determined hitch location information to change a sensing range of an ultrasonic sensor system of the vehicle. For example, if the camera detects that the hitch (or other attachment) extends a certain distance beyond the rear bumper of the vehicle, the camera or system can inform the ultrasonic sensing system of the vehicle (via the CAN bus) to adjust the warning zone (the rearward distance at which warning tones or visual warnings are generated when an object is detected rearward of the vehicle) outward by that same distance. The benefit is a reduced likelihood of backing the hitch into another vehicle, a wall, or some other barrier (when the ultrasonic sensing system functions as if the rear bumper is the rearward-most part of the vehicle).

The system thus prevents damage to the tailgate, the hitch, objects attached to the hitch and/or other objects rearward of the vehicle and provides enhanced customer satisfaction. The system may utilize the rear camera of the vehicle that is already installed at the vehicle (e.g., the rear backup camera or other rearward viewing camera of the vehicle).

Therefore, during a reversing maneuver of the vehicle (such as responsive to the vehicle shifting into a reverse gear or reverse propulsion), the rear backup camera operates to capture image data during reversing of the vehicle, whereby image data captured by the rear backup camera is processed for display at a display screen of video images for viewing by the driver during the reversing maneuver and is processed for object detection. When the vehicle is powered, and when the rear backup camera operates and views the hitch ball (which, when mounted at the hitch receiver, extends rearward of the rear bumper of the vehicle, such as by, for example, 4 inches, or 6 inches, or 8 inches or more), the system determines when the hitch ball is present and in the downward swing path of the tailgate. Responsive to determining that the hitch ball is present and in the downward swing path of the tailgate, the system outputs a message on a CAN bus (controller area network) of the vehicle, which generates a signal to the tailgate opening system to disable the tailgate latch from being released and to keep the tailgate from opening (or optionally to allow the tailgate to partially open but limiting its downward travel to a location or orientation that avoids impact with the hitch ball). The system may also convey a message to the operator (such as at the video display screen in the vehicle or to a screen or indicator at the rear of the vehicle) to alert the operator that the tailgate release mechanism has been disabled.

The system may utilize any suitable camera, such as the existing rear backup camera of the vehicle or other rearward viewing camera at the vehicle. For example, the camera (e.g., the rear backup camera) may comprise a RIO Camera provided by Magna Electronics Inc. of Auburn Hills, Michigan. As shown in FIGS. 2A-5, the RIO Camera includes a mega-pixel imager, a two-board stack (of printed circuit boards) and a multi-core processor that outputs NTSC video to a connector and that communicates with a CAN bus. The camera 14 may connect directly (such as with a plug-in pigtail harness).

The camera 14 may comprise a smart camera that includes processing circuitry, such as the multi-core processor (digital signal processing (DSP) and advanced reduced instruction set computer (RISC) machine (ARM)), and machine vision algorithms may run on the multi-core processor. The camera may provide ISP support and high dynamic range with local tone mapping. A powerful spatial transform engine may provide flexible viewing mode design. Thus, the camera 14 provides a single unit that may provide the features and performance of a system that would typically require the camera and a separate ECU. The camera may include a metal housing for better thermal management. Further, the camera 14 may provide a relatively small size cross-section (such as a front size of about 23 millimeters by 23 millimeters and a rear size of about 23 millimeters by 28 millimeters).

The camera 14 includes a front housing portion or lens holder 22 having an aperture that accommodates a lens barrel 24 that includes one or more lens or optic elements. In the illustrated example of FIGS. 3 and 4, the lens holder 22 comprises a substantially planar cover or housing element that mates with a rear housing portion or rear cover 26 to house the two-board stack of printed circuit boards (PCBs) at an interior portion of the camera housing.

An imager printed circuit board (imager PCB) 28 includes an imager and is disposed at the lens holder 22 such that the imager is aligned with the lens barrel assembly 24. A connector printed circuit board (connector PCB) 30 is electrically connected to the imager PCB and is disposed at an opposite side of the imager PCB 28 from the imager. A header connector 32 is disposed on the opposite side of the connector PCB 30 from the imager PCB 28 and is configured to connect to a six-way connector 34 disposed in a connector portion 26a of the rear housing 26 when the front and rear housings are joined together. The connector 34 may be disposed at the connector portion 26a of the rear housing 26 with an O-ring seal or gasket circumscribing the connector 34 to preclude entrance of moisture or contaminants into the camera housing. A thermal pad or other suitable thermal element 36 may be disposed at a rear surface of the rear housing 26 and engage the connector PCB 30 to help dissipate heat from the two-board stack and through the metal rear housing 26 of the camera 14. One or more screws or other suitable threaded fasteners 38 may extend through the front housing 22, the imager PCB 28, the connector PCB 30 and be received at threaded receivers of the rear housing 26 to join the camera components together.

The system may utilize aspects of the door control systems described in U.S. Pat. Nos. 11,124,113 and/or 9,068, 390, and/or U.S. Publication No. US-2022-0227366, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forward, sideward or rearward directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268; 7,370,983; 7,937,667 and/or 9,800,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S.

Pat. Nos. 6,396,397 and/or 7,123,168, which are hereby incorporated herein by reference in their entireties, and/or the like.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system may utilize aspects of the parking assist systems described in U.S. Pat. No. 8,874,317 and/or U.S. Publication Nos. US-2017-0329346; US-2017-0317748; US-2017-0253237; US-2017-0050672; US-2017-0017848; US-2017-0015312 and/or US-2015-0344028, which are hereby incorporated herein by reference in their entireties.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2022-0028111; US-2022-0027644; US-2022-0024391; US-2021-0170947; US-2021-0170820; US-2021-0078634; US-2020-0406967; US-2020-0361397; US-2020-0356788; US-2020-0334475; US-2020-0017143; US-2019-0347825; US-2019-0118860; US-2019-0064831; US-2018-0276838; US-2018-0215382; US-2017-0254873; US-2017-0217372 and/or US-2015-0002670, and/or International Publication No. WO 2021/0127693, which are all hereby incorporated herein by reference in their entireties.

Optionally, the vehicular camera and/or system may be integrated with a camera monitoring system (CMS) of the vehicle. The integrated vehicle system incorporates multiple inputs, such as from an inward viewing or driver monitoring camera and from a forward or outward viewing camera, as well as from the rearward viewing camera and sideward viewing cameras of the CMS, to provide the driver with unique collision mitigation capabilities based on full vehicle environment and driver awareness state. The rearward viewing camera may comprise a rear backup camera of the vehicle or may comprise a centrally located higher mounted camera (such as at a center high-mounted stop lamp (CHMSL) of the vehicle), whereby the rearward viewing camera may view rearward and downward toward the ground at and rearward of the vehicle. The cameras and system may utilize aspects of the systems described in U.S. Publication Nos. US-2021-0245662; US-2021-0162926; US-2021-0155167; US-2018-0134217 and/or US-2014-0285666, and/or International Publication No. WO 2022/150826, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 10,442,360 and/or 10,046,706, and/or U.S. Publication Nos. US-2021-0245662; US-2021-0162926; US-2021-0155167 and/or US-2019-0118717, and/or International Publication No. WO 2022/150826, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
    a camera disposed at a rear portion of a vehicle equipped with the vehicular vision system and viewing rearward of the vehicle, wherein the camera is operable to capture image data;
    wherein the camera comprises a CMOS imaging sensor, and wherein the CMOS imaging sensor comprises at least one million photosensors arranged in rows and columns;
    wherein the vehicle has a tailgate that is pivotable about a horizontal pivot axis and is movable along a downward swing path from a closed position toward an opened position;
    an electronic control unit (ECU) having circuitry and associated software, wherein the circuitry includes an image processor that is operable to process image data captured by the camera;
    wherein image data captured by the camera is processed at the ECU to detect presence of an object present in a field of view of the camera;
    wherein the vehicular vision system, responsive to detection of the object, determines location of the object relative to the downward swing path of the tailgate; and
    wherein the vehicular vision system, responsive to determination that the detected object is located within the downward swing path of the tailgate between the closed position and the opened position, limits movement of the tailgate of the vehicle along the downward swing path toward the opened position.

2. The vehicular vision system of claim 1, wherein the vehicular vision system allows movement of the tailgate of the vehicle along the downward swing path of the tailgate from the closed position toward the opened position up to the determined location of the object within the downward swing path of the tailgate between the closed position and the opened position.

3. The vehicular vision system of claim 1, wherein the vehicular vision system, responsive to determination that the object is not located within the downward swing path of the tailgate between the closed position and the opened position, allows movement of the tailgate of the vehicle from the closed position to the opened position.

4. The vehicular vision system of claim 1, wherein the detected object comprises an attachment received at a hitch receiver of the vehicle.

5. The vehicular vision system of claim 4, wherein the attachment comprises a bike rack.

6. The vehicular vision system of claim 1, wherein the detected object comprises a rear step attached at the vehicle.

7. The vehicular vision system of claim 1, wherein the detected object comprises a hitch ball mount attached at a hitch receiver of the vehicle.

8. The vehicular vision system of claim 7, wherein the vehicular vision system, responsive to detection of the hitch ball mount attached at the hitch receiver of the vehicle, determines a rearward distance from a rear bumper of the vehicle to a rearward end of the hitch ball mount attached at the hitch receiver of the vehicle.

9. The vehicular vision system of claim 8, wherein the vehicular vision system, responsive to determination of the rearward distance from the rear bumper of the vehicle to the rearward end of the hitch ball mount attached at the hitch receiver of the vehicle, adjusts an ultrasonic sensing system of the vehicle.

10. The vehicular vision system of claim 9, wherein a warning zone distance of the ultrasonic sensing system is adjusted outward to accommodate the determined rearward distance from the rear bumper of the vehicle to the rearward end of the hitch ball mount attached at the hitch receiver of the vehicle.

11. The vehicular vision system of claim 1, wherein the detected object is rearward of the vehicle and not attached at the vehicle.

12. The vehicular vision system of claim 1, wherein the camera comprises a rear backup camera of the vehicle.

13. The vehicular vision system of claim 12, wherein the image data captured by the camera and processed at the ECU to detect presence of the object in the field of view of the camera is captured by the camera during a reversing maneuver of the vehicle.

14. The vehicular vision system of claim 1, wherein the camera is disposed at the tailgate of the vehicle.

15. The vehicular vision system of claim 14, wherein the image data captured by the camera and processed by the image processor to detect presence of the object in the field of view of the camera is captured by the camera with the tailgate of the vehicle in the closed position.

16. The vehicular vision system of claim 1, wherein, responsive to determination that the detected object is located within the downward swing path of the tailgate between the closed position and the opened position, the vehicular vision system communicates with a tailgate opening system to disable operation of a tailgate latch mechanism.

17. A vehicular vision system, the vehicular vision system comprising:
a camera disposed at a rear portion of a vehicle equipped with the vehicular vision system and viewing rearward of the vehicle, wherein the camera is operable to capture image data;
wherein the camera comprises a CMOS imaging sensor, and wherein the CMOS imaging sensor comprises at least one million photosensors arranged in rows and columns;
wherein the vehicle has a tailgate that is pivotable about a horizontal pivot axis and is movable along a downward swing path from a closed position toward an opened position;
an electronic control unit (ECU) having circuitry and associated software, wherein the circuitry includes an image processor that is operable to process image data captured by the camera;
wherein image data captured by the camera is processed at the ECU to detect presence of an object present in a field of view of the camera;
wherein the vehicular vision system, responsive to detection of the object, determines location of the object relative to the downward swing path of the tailgate;
wherein the vehicular vision system, responsive to determination that the detected object is located within the downward swing path of the tailgate between the closed position and the opened position, limits movement of the tailgate of the vehicle along the downward swing path toward the opened position;
wherein the vehicular vision system allows movement of the tailgate of the vehicle along the downward swing path of the tailgate from the closed position toward the opened position up to the determined location of the object within the downward swing path of the tailgate between the closed position and the opened position; and
wherein the vehicular vision system, responsive to determination that the object is not located within the downward swing path of the tailgate between the closed position and the opened position, allows movement of the tailgate of the vehicle from the closed position to the opened position.

18. The vehicular vision system of claim 17, wherein the detected object comprises an attachment received at a hitch receiver of the vehicle.

19. The vehicular vision system of claim 17, wherein the detected object is rearward of the vehicle and not attached at the vehicle.

20. The vehicular vision system of claim 17, wherein the camera comprises a rear backup camera of the vehicle.

21. The vehicular vision system of claim 20, wherein the image data captured by the camera and processed at the ECU to detect presence of the object in the field of view of the camera is captured by the camera during a reversing maneuver of the vehicle.

22. The vehicular vision system of claim 17, wherein the camera is disposed at the tailgate of the vehicle.

23. The vehicular vision system of claim 17, wherein, responsive to determination that the detected object is located within the downward swing path of the tailgate between the closed position and the opened position, the vehicular vision system communicates with a tailgate opening system to disable operation of a tailgate latch mechanism.

24. A vehicular vision system, the vehicular vision system comprising:
a camera disposed at a rear portion of a vehicle equipped with the vehicular vision system and viewing rearward of the vehicle, wherein the camera is operable to capture image data, and wherein the camera comprises a rear backup camera of the vehicle;

wherein the camera comprises a CMOS imaging sensor, and wherein the CMOS imaging sensor comprises at least one million photosensors arranged in rows and columns;

wherein the vehicle has a tailgate that is pivotable about a horizontal pivot axis and is movable along a downward swing path from a closed position toward an opened position;

an electronic control unit (ECU) having circuitry and associated software, wherein the circuitry includes an image processor that is operable to process image data captured by the camera;

wherein image data captured by the camera is processed at the ECU to detect presence of an object present in a field of view of the camera;

wherein the vehicular vision system, responsive to detection of the object, determines location of the object relative to the downward swing path of the tailgate;

wherein the vehicular vision system, responsive to determination that the detected object is located within the downward swing path of the tailgate between the closed position and the opened position, limits movement of the tailgate of the vehicle along the downward swing path toward the opened position;

wherein the detected object comprises a hitch ball mount attached at a hitch receiver of the vehicle;

wherein the vehicular vision system, responsive to detection of the hitch ball mount attached at the hitch receiver of the vehicle, determines a rearward distance from a rear bumper of the vehicle to a rearward end of the hitch ball mount attached at the hitch receiver of the vehicle; and wherein the vehicular vision system, responsive to determination of the rearward distance from the rear bumper of the vehicle to the rearward end of the hitch ball mount attached at the hitch receiver of the vehicle, adjusts a warning zone distance of an ultrasonic sensing system of the vehicle.

25. The vehicular vision system of claim 24, wherein the vehicular vision system allows movement of the tailgate of the vehicle along the downward swing path of the tailgate from the closed position toward the opened position up to the determined location of the object within the downward swing path of the tailgate between the closed position and the opened position.

26. The vehicular vision system of claim 24, wherein the vehicular vision system, responsive to determination that the object is not located within the downward swing path of the tailgate between the closed position and the opened position, allows movement of the tailgate of the vehicle from the closed position to the opened position.

27. The vehicular vision system of claim 24, wherein the warning zone distance of the ultrasonic sensing system is adjusted outward to accommodate the determined rearward distance from the rear bumper of the vehicle to the rearward end of the hitch ball mount attached at the hitch receiver of the vehicle.

28. The vehicular vision system of claim 24, wherein the camera is disposed at the tailgate of the vehicle.

* * * * *